US011348165B2

(12) United States Patent
Indrakanti et al.

(10) Patent No.: US 11,348,165 B2
(45) Date of Patent: May 31, 2022

(54) METHOD, MEDIUM, AND SYSTEM FOR RANKING THEMES USING MACHINE LEARNING

(71) Applicant: eBay Inc., San Jose, CA (US)

(72) Inventors: Saratchandra Indrakanti, San Jose, CA (US); Sriganesh Madhvanath, Pittsford, NY (US); Gyanit Singh, Fremont, CA (US)

(73) Assignee: eBay Inc., San Jose, CA (US)

( * ) Notice: Subject to any disclaimer, the term of this patent is extended or adjusted under 35 U.S.C. 154(b) by 97 days.

(21) Appl. No.: 16/526,797

(22) Filed: Jul. 30, 2019

(65) Prior Publication Data

US 2021/0035197 A1 Feb. 4, 2021

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0627* (2013.01); *G06Q 30/0633* (2013.01)

(58) Field of Classification Search
CPC .......... G06Q 30/0643; G06Q 30/0627; G06Q 30/0633; G06F 16/353; G06F 16/355; G06F 16/358; G06F 16/35
See application file for complete search history.

(56) References Cited

U.S. PATENT DOCUMENTS

| | | | |
|---|---|---|---|
| 7,472,077 B2 | 12/2008 | Roseman et al. | |
| 8,175,935 B2 | 5/2012 | Dearlove et al. | |
| 8,863,002 B2 | 10/2014 | Chandler et al. | |
| 10,169,799 B2 | 1/2019 | Somaiya et al. | |
| 2006/0224954 A1* | 10/2006 | Chandler | G06F 16/957 |
| | | | 715/788 |
| 2007/0288433 A1* | 12/2007 | Gupta | G06F 16/3334 |
| 2009/0171813 A1* | 7/2009 | Byrne | G06Q 30/0623 |
| | | | 707/999.005 |

(Continued)

OTHER PUBLICATIONS

Richardson, Matthew, Amit Prakash, and Eric Brill. "Beyond PageRank: machine learning for static ranking." Proceedings of the 15th international conference on World Wide Web. 2006. (Year: 2006).*

(Continued)

*Primary Examiner* — Matthew E Zimmerman
(74) *Attorney, Agent, or Firm* — FIG. 1 Patents

(57) ABSTRACT

Generating themes for different item offers is described. An item listing system receives a request for a target item and generates themes for the target item by grouping offers based on their properties. The item listing system then determines a display order for the themes based on user behavior data. The item listing system then communicates the themes and display order to a client device from which the request was received, causing the client device to display an interface including at least a subset of the themes, arranged according to the display order. Themes including offers determined to be more appealing to the user of the client device are displayed more prominently relative to other themes. The item listing system is further configured to dynamically modify the display order in real-time based on offer changes, such that the interface continuously provides correct information describing available offers for the target item.

20 Claims, 8 Drawing Sheets

(56) References Cited

U.S. PATENT DOCUMENTS

| | | | | |
|---|---|---|---|---|
| 2011/0060659 A1* | 3/2011 | King | ............... | G06Q 30/0631 |
| | | | | 705/26.7 |
| 2011/0093361 A1* | 4/2011 | Morales | ............ | G06Q 30/0603 |
| | | | | 705/26.62 |
| 2011/0295720 A1* | 12/2011 | Parikh | ............... | G06Q 30/0641 |
| | | | | 707/765 |
| 2012/0072302 A1* | 3/2012 | Chen | ............... | G06Q 30/0631 |
| | | | | 707/723 |
| 2012/0259844 A1* | 10/2012 | Yuan | ................. | G06F 16/951 |
| | | | | 707/723 |
| 2017/0293695 A1* | 10/2017 | Brovman | ........... | G06Q 30/0631 |
| 2019/0163758 A1* | 5/2019 | Zhivotvorev | ..... | G06F 16/24578 |

OTHER PUBLICATIONS

Indrakanti et al., "Theme Ranking : Showcasing Interesting Buying Choices to Ecommerce Shoppers", eBay Shopping Science, Sep. 2018, 10 pages.

\* cited by examiner

METHOD, MEDIUM, AND SYSTEM FOR RANKING THEMES USING MACHINE LEARNING

BACKGROUND

With advances in computing technology, online marketplaces and other e-commerce listing platforms are becoming an increasingly preferred mechanism for shopping over traditional brick-and-mortar storefronts. As more vendors offer goods and services for sale, online marketplaces are unable to present a total number of items available for purchase in a single user interface due to limited computing device display areas. This problem is particularly significant when users access online marketplace interfaces using computing devices having small form factors, such as personal smartphones, wearable devices, and the like. Further, even when a user is able to locate an item of interest, a single online marketplace may include offers to purchase the item of interest from a large number of different vendors, which in turn may offer the item with different properties, such as different item conditions, shipping speeds, return policies, pricing, and so forth.

As a result, users are forced to navigate among many different interfaces to locate an offer with acceptable characteristics for the item of interest, which in turn requires consumption of excessive amounts of network and computational resources. Additionally, many users are dissuaded from continuing to search for the item of interest, which results in compromised purchase decisions and a poor user experience. Thus, conventional approaches to listing items on online marketplaces are unable to organize the vast amount of item offers and their different characteristics, which consequently wastes network and computational resources and decreases user engagement with the online marketplace.

SUMMARY

Generating themes for different item offers and dynamically ordering the themes is described. An item listing system receives a request for a target item offered by a listing platform, such as an e-commerce system, an online marketplace, or the like. In response to receiving the request, the item listing system generates themes for the target item. Each theme includes a grouping of one or more offers for sale of the target item, where offers in a theme share at least one common property. Example offer properties include item condition (e.g., new, used, refurbished, damaged, etc.), item shipping speed (e.g., 2-day shipping, standard shipping, etc.), vendor return policy, item pricing, and so forth. After generating different themes and assigning different target item offers to respective themes, the item listing system determines a display order for presentation of the themes. In some implementations, the item listing system determines the display order based on user behavior data that describes previous interactions between the listing platform and users, such as the user that submitted a request for the target item.

After generating the themes, assigning target item offers to themes, and determining the theme display order, the item listing system communicates the themes with their grouped offers and the display order to a client device from which the request for the target item was received. In turn, the item listing system causes the client device to output a user interface that includes a display of representations for at least a subset of the themes generated by the item listing platform. The user interface includes an ordering of the representations for the subset of the themes as specified by the display order, such that themes including offers that are determined to be more appealing to the user of the client device are displayed in more prominent positions of the user interface than other themes of the subset. In some implementations, the theme representations include visual icons or tabs that are selectable to cause display of corresponding target item offers included in the selected theme. The item listing system is further configured to dynamically modify the display of the theme representations in real-time based on changes to offers, such that the display order actively updates to provide a requesting user with comprehensive information describing available offers for the requested target item.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
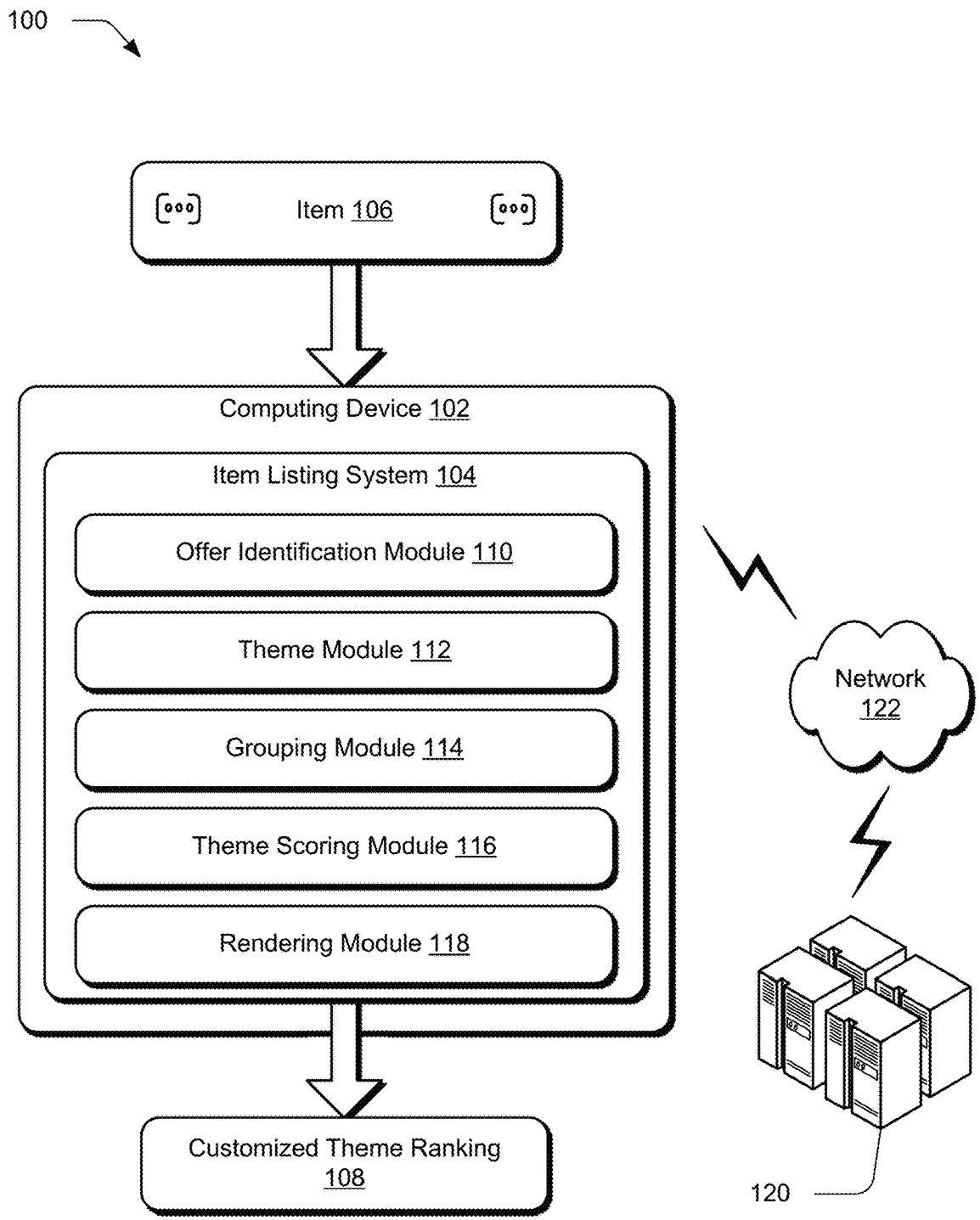
FIG. 1 is an illustration of an environment in an example implementation that is operable to employ the item offer theme generating and ordering techniques described herein.

With advances in computing technologies, users are presented with an ever increasing inventory of offers for sale of products or services, which may be collectively referred to for simplicity as "items." For instance, an online marketplace may enable multiple different vendors to offer for sale a particular product, where each vendor in turn may offer the particular product for sale in different conditions, with different shipping speeds, with different return policies, and so forth. This variety in offers for sale of a single given item provides users with a spectrum of different selection choices that are unable to be displayed in any single interface. For instance, a popular smartphone may have several hundreds or thousands of different offers for sale, each of which may have differing properties and characteristics. Thus, users often face the difficult task of navigating the online marketplace to browse these different offers with no guarantee of finding an offer in which the users are interested, even if such an offer is available.

Some conventional service providers group offers for sale of a given item into categories based on shared properties or characteristics. However, conventional service providers display different categories in a static, unchanging order, which is ineffective in adapting to different user preferences or changing conditions pertaining to a given item of interest. For example, in an example scenario where a service provider groups offers for sale based on a condition of the item to be sold, statically presenting a display of new items first and used items second may be appropriate for a newly released product. However, such a static display may be inappropriate for presenting refurbished or used versions of a product that was released years ago and has subsequently been replaced by newer versions, where users would consequently be unduly faced with the task of navigating through offers for sale of the newer versions of the same product before ultimately reaching offers for sale of the refurbished versions. These static displays of conventional approaches similarly fail to dynamically adjust to changing conditions such as temporary price fluctuations, sales events, or other external events that effect demand for a given item. Furthermore, conventional static display arrangements do not account for user-specific information such as previous user interactions with the service provider, personal purchasing habits, or other user preferences, thereby failing to present offers for sale of a given item in a manner that readily presents offers most likely of interest to a particular user.

Consequently, conventional approaches to organizing offers for sale of an item are unable to do so in a manner that identifies offers most likely of interest to a given user and presents the offers of interest in a prominent location. As such, conventional approaches often force users to excessively navigate through multiple "uninteresting" offers before locating an offer of interest. Doing so requires multiple inputs from the user which increases processing resources, while making the task of finding an interesting offer for a particular item time consuming and frustrating for the user.

To overcome these problems, generation and ordering of item offer themes is described. For a given item of interest, an item listing system identifies offers for the item of interest available on one or more listing platforms. The item listing system further analyzes each offer for sale of the item of interest to identify different properties defining the offer for the item. As described throughout, such properties may be associated with the item (e.g., a condition of the item), and/or the offer itself (e.g., shipping speed, return policy, seller reputation, or sales format). From the identified properties, the item listing service generates a plurality of different themes, where each theme may be defined by one or a combination of properties. The identified offers for sale of the item of interest are then grouped into respective ones of the themes based on their associated properties, such that all offers included in a given theme share at least one common property. For instance, in an example scenario where the item of interest is a smartphone, the item listing system may identify that available offers include various conditions of the smartphone, such as new, used, and refurbished. In such a scenario, the item listing system may generate "new," "used," and "refurbished" themes for the smartphone, and group different offers into respective themes based on their associated item conditions.

After generating different themes for an item of interest and grouping available offers for sale into the different themes, the item listing system determines a display order for the themes. This display order is determined by ranking the different themes according to various information, such as user behavior data describing previous user interactions with a listing platform, historical inventory data for the item of interest, real-time data describing a current supply of the item of interest, a current price associated with the item of interest, combinations thereof, and so forth.

The display order is useable by the item listing system to identify a top-ranked subset of themes for the item of interest to be included in a user interface for presentation to a user searching the listing platform for the item of interest. For example, if a client device browsing an online marketplace includes only enough display area to list four different themes for the item of interest, the item listing system may render an interface that includes representations of only the four highest-ranked themes. These themes may be displayed in the interface in a prioritized manner, such that the highest-ranked theme is displayed in a most prominent position of the interface and the fourth-highest ranked theme is displayed in a least prominent positon of the interface.

In this manner, the techniques described herein overcome deficiencies of conventional techniques by grouping offers for sale of an item into themes based on their associated properties, and ordering the themes for display based on a likelihood that a theme is of interest to a user. Moreover, these techniques facilitate display of different themes that are particular to a specified item of interest, where the display order of the different themes can be updated in real-time to reflect external conditions and personal user preferences relating to the item of interest. By generating and ordering item offer themes using the techniques described herein, users of the item listing system are presented with comprehensive information describing availability of offers for sale of an item in a manner that reduces inputs required by conventional approaches to reach offers of interest, thereby reducing computational and network resources consumed during interactions with a listing platform and enabling users to make smart and efficient purchasing decisions.

In the following discussion, an example environment is described that may employ the theme display order determination techniques described herein. Example procedures are also described which may be performed in the example environment as well as other environments. Consequently, performance of the example procedures is not limited to the example environment and the example environment is not limited to the performance of the example procedures.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 8.

The computing device 102 is illustrated as including item listing system 104. Item listing system 104 represents functionality of the computing device 102 to receive one or more items 106 offered for sale by a listing platform and generate customized theme rankings 108 for the various offers for sale of the item 106. As described in further detail below, the customized theme ranking 108 for the item 106 are representative of one or more themes that each include groupings of various offers for sale of the item 106, where the offers for sale are grouped into different themes based on offer properties.

To generate the customized theme ranking 108 for an item 106, the item listing system 104 employs an offer identification module 110, a theme module 112, a grouping module 114, a theme scoring module 116, and a rendering module 118. The offer identification module 110, the theme module 112, the grouping module 114, the theme scoring module 116, and the rendering module 118 are each implemented at least partially in hardware of the computing device 102 (e.g., through use of a processing system and computer-readable storage media), as described in further detail below with respect to FIG. 8.

Upon receiving the item 106, the offer identification module 110 is configured to identify one or more offers for sale of the item 106. The offer identification module 110 may identify offers for sale of the item 106 on a single listing platform or may identify offers for sale of the item 106 across a number of different listing platforms, such as across a number of different online marketplaces. The identified offers for sale of the item 106 may include a number of different sellers or vendors, and may be identified along with information describing various properties of the offer that are useable to differentiate the offers from one another. The identified offers for sale of the item 106 are then communicated to the theme module 112. The theme module 112 is representative of functionality to generate one or more themes for organizing the offers for sale of the item 106. As described in further detail below, the theme module 112 generates themes for offers for sale of the item 106 based on properties of the various offers for sale of the item 106, such that different themes for the item 106 can be defined based on one or more offer properties. For example, the theme module 112 may generate a "new" theme, a "used" theme, and a "refurbished" theme for the item 106. After generating the item themes, the theme module 112 communicates the item offers identified by the offer identification module 110 and the generated themes to the grouping module 114.

The grouping module 114 is representative of functionality to group the identified offers for sale of the item 106 into different ones of the themes generated by the theme module 112. Identified offers for sale of the item 106 are grouped by the grouping module 114 into the themes based on their associated offer properties, such as item condition, seller shipping speed, seller return policy, sale type, and so forth. In this manner, the grouping module 114 is configured to differentiate among offers for sale of the same item 106 in a manner that enables browsing of the identified offers for sale in an intuitive manner and reduces a number of user inputs otherwise required to navigate among offers in an online marketplace. To further improve an ease of navigating and interacting with a user interface that includes a display of content incorporating the customized theme ranking 108, such as the examples illustrated in FIGS. 4 and 5 and described in further detail below, the item listing system 104 is configured to implement the theme scoring module 116 to assign scores to different ones of the themes generated by the theme module 112.

A manner in which the theme scoring module 116 generates scores for each of the themes generated by the theme module 112 leverages both historic information for the item 106, as well as real-time information describing a current availability of the item 106, as described in further detail below with respect to FIG. 6. Generally, a score assigned to each theme for the item 106 is representative of a likelihood that the theme is of interest to a user browsing the listing platform for the item 106. In this manner, the theme scoring module 116 is configured to identify certain groupings of offers for sale of the item 106 that are most likely of interest to a user of the item listing system 104. The scores generated by the theme scoring module 116 can be used by the rendering module 118 to output an interface that displays the various offers for sale of the item 106 in a manner that presents more relevant offers for sale of the item 106 in more prominent locations of the interface, relative to other offers for sale of the item 106 that are less likely of interest to a viewing user.

The customized theme ranking 108 for the item 106 may be stored in storage of the computing device 102, as described in further detail below with respect to FIG. 8. Alternatively or additionally, the item listing system 104 is configured to provide the item and customized theme ranking 108 to a remote storage location for subsequent retrieval and/or access by the computing device 102 or different computing devices. For instance, the item listing system 104 may communicate the item 106 and customized theme ranking 108 to remote storage 122, or directly to a different computing device, via network 124.

Having considered an example digital medium environment, consider now a discussion of an example system usable to generate and output a display of a customized theme ranking for an item in accordance with aspects of the disclosure herein.

Figure 2:
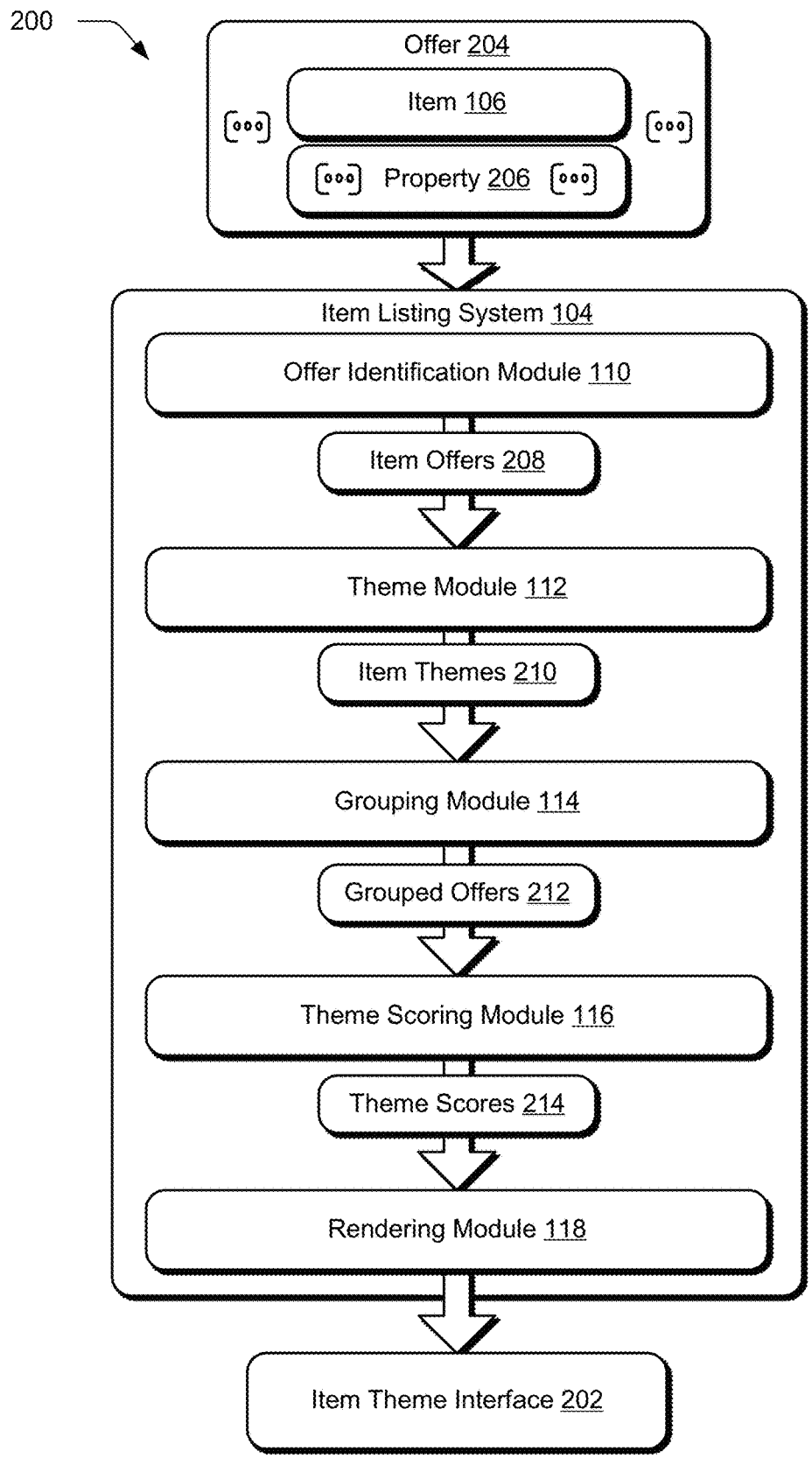
FIG. 2 illustrates an example implementation in which an item listing system of FIG. 1 generates a customized theme ranking and an item offer theme interface using techniques described herein.

FIG. 2 illustrates an example system 200 useable to generate an item theme interface 202 that includes a customized theme ranking 108 of various themes for an item 106 in accordance with the techniques described herein. In the illustrated example, system 200 includes modules of the item listing system 104 as described with respect to FIG. 1, including the offer identification module 110, the theme module 112, the grouping module 114, the theme scoring module 116, and the rendering module 118. System 200 is implemented on one computing device (e.g., computing device 102 of FIG. 1). In another example, system 200 is implemented on more than one computing device, as described in further detail below with respect to FIG. 8.

In the example system 200, the item listing system 104 is configured to generate an item theme interface 202 that that presents more relevant offers for sale of the item 106 in more prominent locations of the interface relative to other offers for sale of the item 106 that are less likely of interest to a viewing user. To do so, the offer identification module 110 receives an indication of an item 106 for which the item theme interface 202 is to be generated. The item 106 may be specified in any suitable manner, such as via entry of a search query into a search interface of a listing platform or online marketplace, and may be referred to as a "target item" for the item theme interface. Upon identifying the item 106, the offer identification module 110 identifies a plurality of offers 204 for sale of the item 106. The offer identification module 110 may identify offers for sale of the item 106 on a single listing platform or may identify offers for sale of the item 106 across a number of different listing platforms, such as across a number of different online marketplaces.

The identified offers 204 may be associated with a number of different sellers or vendors, and may be distinguished from one another based on one or more properties 206 associated with the offer 204. For instance, properties 206 of an offer 204 may indicate a condition of the item 106 (e.g., new, new with damaged packaging or without packaging, refurbished, used, broken, etc.). Alternatively or additionally, properties 206 may indicate a format in which the item 106 can be purchased (e.g., buy it now, make an offer, auction, etc.). Alternatively or additionally, the properties 206 may indicate a manner of shipping associated with the offer 204 (e.g., same-day, overnight, 2-days, standard, etc.). Alternatively or additionally, the properties 206 may indicate a return policy of a seller providing the offer 204 (e.g., 30 days with shipping paid by buyer, 30 day free returns, no returns, and so forth). The properties 206 of an offer 204 may thus indicate any suitable information pertaining to the item and associated manner in which a user of the item listing system 104 is able to purchase or accept an offer 204 to sell the item 106, and are not so limited to the above examples. The offer identification module 110 is configured to identify offers 204 for the item 106, and their corresponding properties 206, in any suitable manner, such as via an item catalog for a listing platform, by crawling an online marketplace, combinations thereof, and so forth. Upon identifying the offers 204 for an item 106, the offer identification module 110 generates item offers 208, which are representative of a plurality of offers 204 for the item 106 and their corresponding properties 206 on one or more listing platforms.

The offer identification module 110 then communicates the item offers 208 to the theme module 112. Upon receipt of the item offers 208, the theme module 112 generates a plurality of item themes 210 for the item 106. To do so, the theme module considers the various properties 206 as included in the item offers 208 and generates separate themes for different properties 206 or groupings of properties 206. For instance, in the context of properties 206 indicating a condition of the item 106, the theme module 112 may generate three separate themes into which the offers 204 may be grouped: 1. "new"; 2. "used"; and 3. "refurbished." Alternatively or additionally, the item themes 210 generated by the theme module 112 may be generated based on a combination of multiple properties 206. For instance, the item themes 210 may include two different themes for offers 204 that offer the item 106 in a "new" condition based on associated shipping speed, such as: 1. "new, overnight shipping"; and 2. "new, standard shipping." In this manner, the theme module 112 is configured to generate any number of item themes 210 for offers 204 of an item 106 based on values of associated offer properties 206. By generating different item themes 210 for individual properties 206 and/or combinations thereof, the item listing system 104 provides users with a spectrum of choices for purchasing the item 106, which is particularly useful in scenarios where several thousand versions of a single item 106, such as a particular type of a used smartphone, are available for purchase via a single online marketplace.

After generating the item themes 210, the theme module 112 communicates the item offers 208 and the item themes 210 to the grouping module 114. The grouping module 114 is configured to assign respective ones of the item offers 208 to different ones of the item themes 210, based on properties 206 associated with each of the item offers. For instance, item offers 208 are assigned to different item themes 210 based on their properties 206, such as item condition, seller shipping speed, seller return policy, sale type, and so forth. In this manner, the grouping module 114 is configured to differentiate among offers for sale of the same item 106 in a manner that enables browsing of the identified offers for sale in an intuitive manner, thereby reducing a number of inputs otherwise required to navigate a listing platform or online marketplace that does not automatically group offers for sale of an item into different themes. After assigning the item offers 208 to respective ones of the item themes 210, the grouping module 114 outputs grouped offers 212, which are representative of each of the item themes 210 as including at least one of the item offers 208.

Given the vast amount of potential item themes 210 for a given item 106, a fixed ordering of themes is ineffective in presenting information that is most pertinent to a viewing user, and does not account for variations in user behaviors and different user preferences, or account for real-time changes regarding current characteristics of the item 106, such as item availability, price changes, and the like. For instance, in the case of item themes 210 based on condition, users may be looking for brand-new offers 204 for a newly released item 106, contrasted against users who may be looking for refurbished versions of the item 106 when the item 106 is no longer newly released. Likewise, item themes 210 based on shipping speed and return policy properties 206 associated with different item offers 208 may vary with respect to relevance based on a type of the item 106. For instance, item themes 210 associated with fast shipping options may be less important to users when the item 106 is categorized as a collectible rather than a trending fashion item. Alternatively or additionally, real-time factors such as temporary price reductions, sales, external events causing a spike in demand for the item 106, and so forth can make a certain item theme 210 more desirable at certain times and less desirable at other times. Furthermore, buying choices and item preferences are often user-specific, such that a static ordered listing of item themes 210 may be desirable to only a certain subset of users and undesirable to other subsets.

To present an item theme interface 202 that accounts for these variations and real-time changes, the item listing system 104 implements theme scoring module 116, which is configured to rank the grouped offers 212 by generating theme scores 214 for the respective item themes 210 associated with each of the grouped offers 212. A manner in which the theme scoring module 116 generates the scores 214 for each of the item themes 210 leverages both historic information for the item 106, as well as real-time information describing a current availability of the item 106, as described in further detail below with respect to FIG. 6. Generally, the theme score 214 assigned to an item theme 210 represents a likelihood that the item theme 210 is of interest to a particular user. In this manner, the theme scoring module 116 is configured to identify certain grouped offers 212 for the item 106 that are most likely of interest to a user of the item listing system 104, and the theme scores 214 generated by the theme scoring module 116 can be used by the rendering module 118 to output the item theme interface 202.

Having considered an example system 200, consider now examples of generating item themes 210 and grouped offers 212 for an item 106, followed by example item theme interfaces 202 that present optimal orderings of the item themes 210 based on a customized theme ranking 108 for the item 106 in accordance with one or more aspects of the disclosure.

Figure 3:
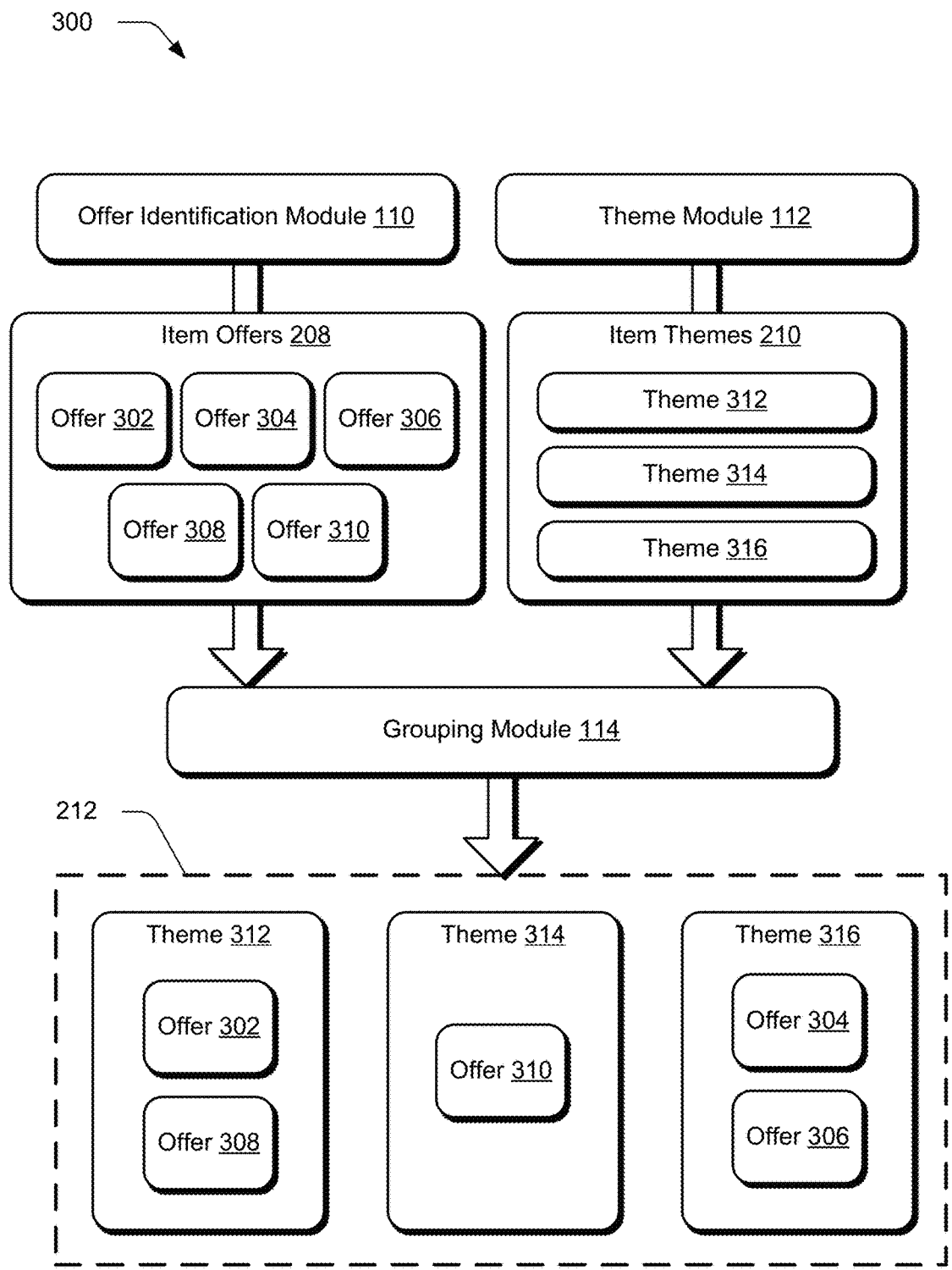
FIG. 3 illustrates an example implementation of themes generated by the item listing system of FIG. 1.

FIG. 3 illustrates an example implementation 300 of the item listing system 104 identifying a plurality of item offers 208, generating a plurality of item themes 210 for grouping the item offers 204, and grouping the item offers 208 into respective ones of the item themes 210 to generate grouped offers 212. In the example implementation, the offer identification module 110 identifies a plurality of item offers 208 for an item of interest 106, which includes offers 302, 304, 306, 308, and 310. Each of the offers 302, 304, 306, 308, and 310 may be associated with one or more properties 206, which may describe a condition of the item 106, a return policy for a seller of the item 106, a shipping speed associated with the offer, a purchasing format for the offer, combinations thereof, and so forth. The offers 302, 304, 306, 308, and 310 and their associated properties 206 are communicated to the theme module 112, as illustrated in FIG. 2, and are useable by the theme module 112 to generate a plurality of item themes 210, illustrated as including themes 312, 314, and 316. In an example scenario, the theme module 112 may identify three distinct properties 206 of the offers 302, 304, 306, 308, and 310, such as "new item condition," "used item condition," and "fast shipping speed." As such, the themes 312, 314, and 316 may each be representative of one of the three distinct properties of the offers 302, 304, 306, 308, and 310. For instance, theme 312 may be generated to include item offers 208 specifying new conditions of the item 106, theme 314 may be generated to include item offers 208 specifying used conditions of the item, and theme 316 may be generated to include item offers 208 associated with fast shipping speeds.

After the offer identification module 110 identifies the item offers 208 for an item of interest and the theme module 112 generates item themes 210 for categorizing the identified item offers 208, the grouping module 114 groups different ones of the offers 302, 304, 306, 308, and 310 into respective ones of the themes 312, 314, and 316 based on properties 206 associated with the offers 302, 304, 306, 308, and 310. For instance, continuing the previous example where theme 312 corresponds to offers for an item of interest in a new condition, the grouping module 114 may identify that offers 302 and 308 pertain to new conditions of an item of interest and assign offers 302 and 308 to theme 312. Continuing the example, where theme 314 corresponds to offers for the item of interest in a used condition, grouping module 114 may identify that offer 310 pertains to a used condition of the item of interest and assign offer 310 to theme 314. Finally, where theme 316 corresponds to offers for the item of interest with a fast shipping speed, the grouping module may identify that offers 304 and 306 are associated with fast shipping speeds and assign offers 304 and 306 to theme 316. In this manner, themes 312, 314, and 316 with one of more of the offers 302, 304, 306, 308, and 310 grouped therein are representative of the grouped offers 212 generated by grouping module 114.

The grouped offers 212 can then be output in an item theme interface 202 and prioritized by associated theme scores 214 to present offers that have a highest likelihood of being of interest to a user of the item listing system 104. Generation of the theme scores 214 for the themes 312, 314, and 316 is described in further detail below with respect to FIG. 6. Prior to a description of generating theme scores, consider first example implementations of an item theme interface 202 that includes a display of various item themes 210 and their grouped offers 212 in accordance with one or more implementations.

Figure 4:
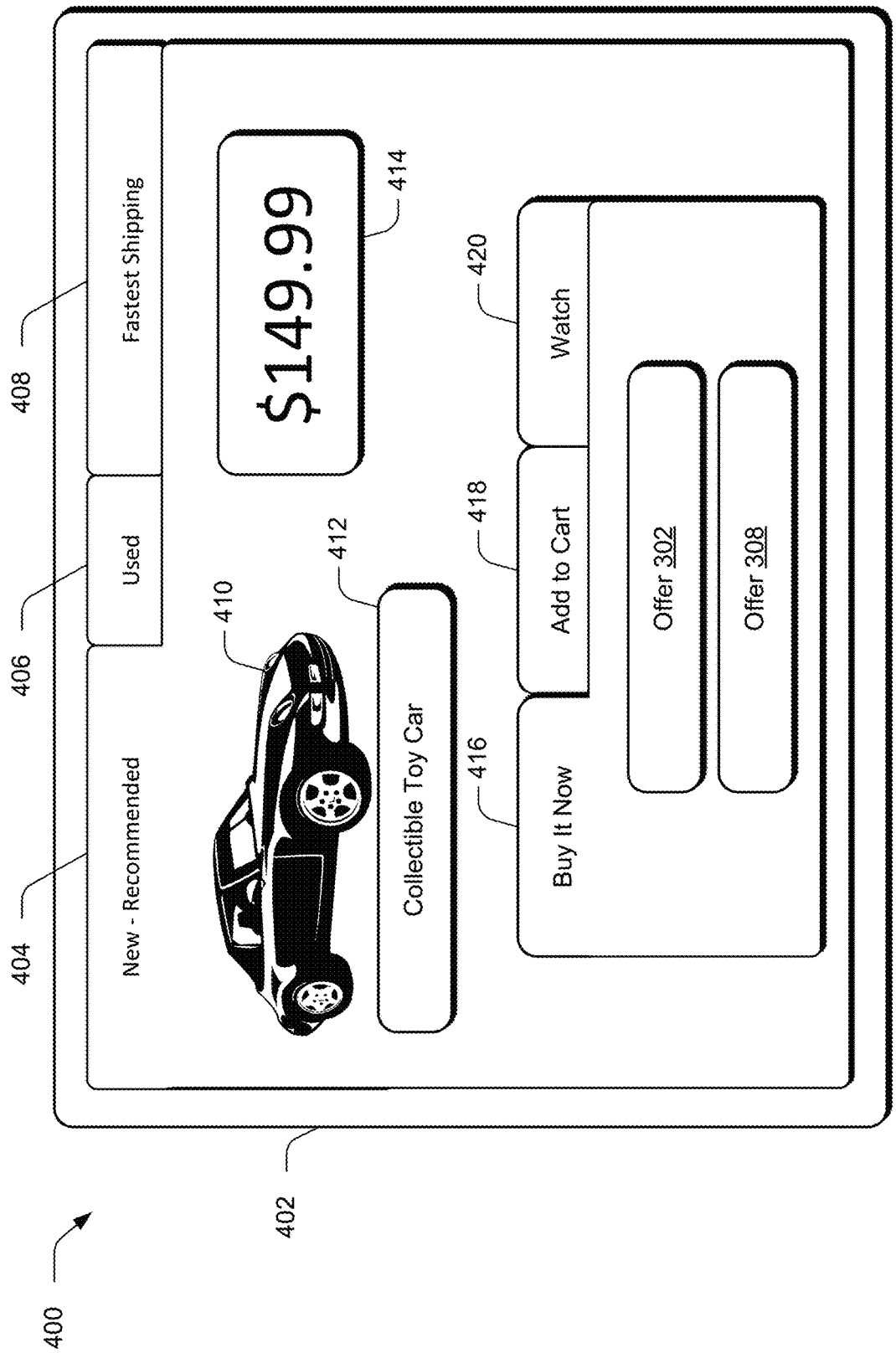
FIG. 4 illustrates an example implementation of ordered themes generated by the item listing system of FIG. 1.

FIG. 4 illustrates an example implementation 400 of an item theme interface 202 generated by the item listing system 104 using the techniques described herein. In the illustrated example, interface 402 includes a tabbed display of themes 404, 406, and 408 for an item of interest 410, which is representative of an item 106 and is indicated by the item descriptor 412 as a "collectible toy car." The three different themes illustrated in interface 402 are representative of item themes 210 generated by the theme module 112, such as themes 312, 314, and 316 illustrated in FIG. 3. For instance, theme 404 is illustrated as corresponding to offers for sale of the item 410 in a new condition, theme 406 is illustrated as corresponding to offers for sale of the item 410 in a used condition, and theme 408 is illustrated as corresponding to offers for sale of the item 410 with a fastest shipping option. Each tab associated with respective themes 404, 406, and 408 may include additional information describing one or more of the offers for sale of the item 410. For instance, interface 402 includes a price indicator 414, along with various elements 416, 418, and 420 that can be selected to perform an action with respect to offers included in the theme 404. Specifically, element 416 enables a user of the item listing system 104 to buy the item 410 now, element 418 enables the user to add the item 410 to a cart, and element 420 enables the user to place the item 410 on a watch list for future purchasing consideration. As described in further detail below with respect to FIG. 6, the item listing system 104 is configured to monitor user interaction with the interface 402 and various elements 416, 418, and 420 for use in generating the theme scores 214 to generate a customized theme ranking 108 to be used in generating item theme interfaces 202.

Grouped offers 212 corresponding to the theme 404 are illustrated as offers 302 and 308, which are representative of two different avenues for a user of the item listing system to purchase the item 410 instantly (i.e., to "buy it now"). Interface 402 may be automatically presented by the item listing system 104 with one of the themes 404, 406, or 408 and its corresponding offer(s) and information actively displayed, or "in focus" upon rendering of the interface 402 by the item listing system 104. Alternatively, the item listing system 104 may initially render interface 402 as only displaying the themes 404, 406, and 408 without any associated offers or information, and proceed to display associated offers and information upon receiving input selecting one of the themes 404, 406, or 408. The themes 404, 406, and 408 may be selected as a subset of a larger corpus of item themes 210 for offers for sale of the item 410 and arranged for display in the interface 402 based on their associated theme scores 214, which are calculated by the theme scoring module 116 and described in further detail below with respect to FIG. 6. In this manner, the interface 402 is configured to present a theme, and its associated offers, most likely of interest for a particular user of the item listing system 104. For instance, in the illustrated example of FIG. 4, interface 402 may be configured based on theme scores 214 indicating that offers for sale of the item 410 in a new condition are most likely of interest to a user, that offers for sale of the item 410 in a used condition are moderately likely to be of interest to the user, and that offers for sale of the item 410 with fastest shipping speed are least likely of interest to the user.

However, an organization of themes and associated offers as presented in interface 402 may vary to account for different users of the item listing system 104, may be dynamically modified to account for variations in available offers for sale of the item 410, combinations thereof, and so forth. For instance, in an example scenario where there is high demand for the item 410, the item listing system 104 may determine that the theme 408, including offers for sale of the item 410 having the fastest available shipping options, are more likely of interest to a user of the item listing system 104 than offers included in the themes 404 and 406 representing new and used conditions of the item, respectively.

Figure 5:
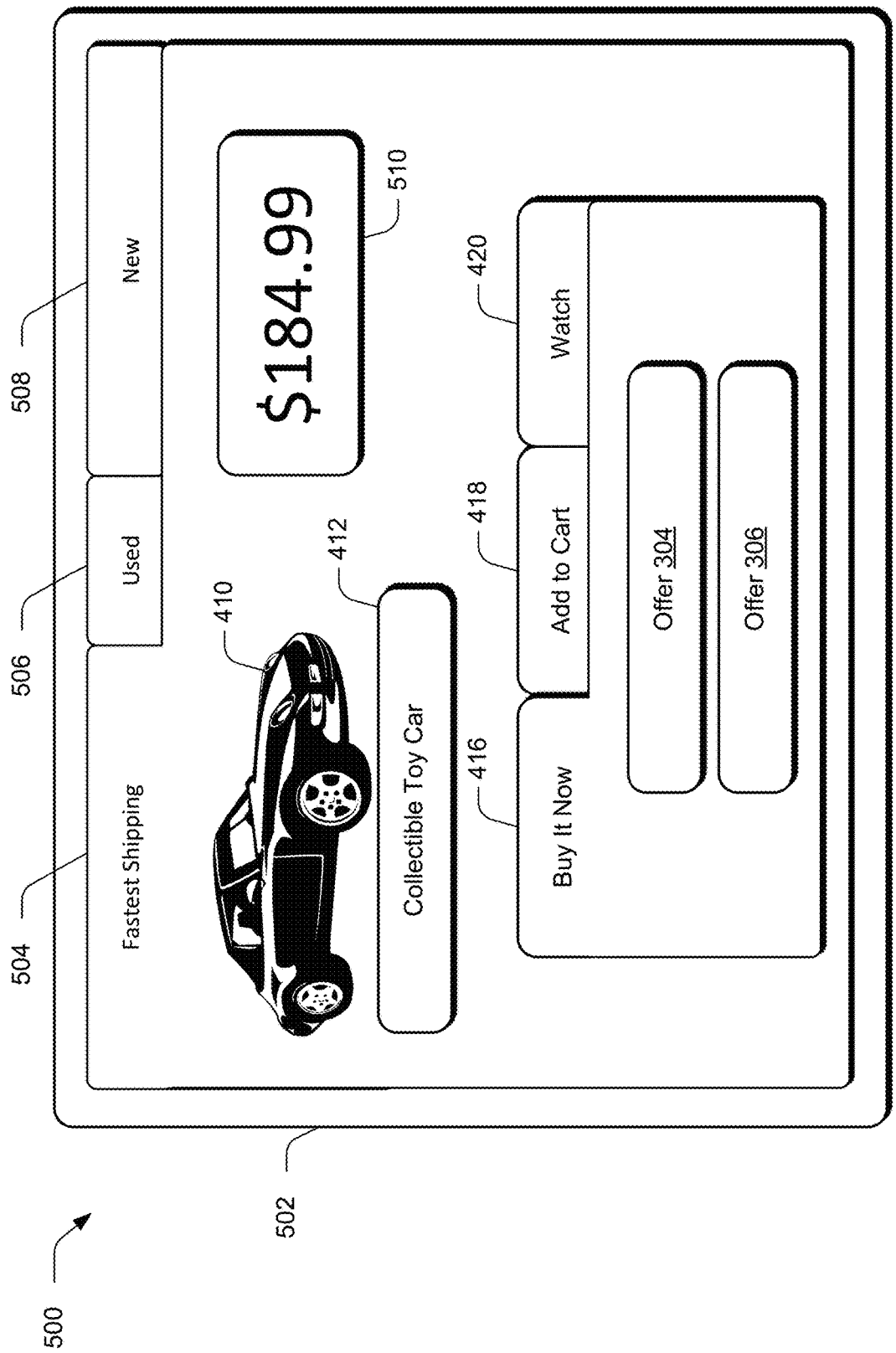
FIG. 5 illustrates an example implementation of ordered themes generated by the item listing system of FIG. 1.

FIG. 5 illustrates an example implementation 500 of dynamically reconfiguring the interface 402 to account for variations in user behavior and other real-time information pertaining to currently available offers for sale of the item 410. In the illustrated example, interface 502 represents a reconfigured instance of interface 402, where the tabbed display of themes 504, 506, and 508 are representative of themes 408, 406, and 404, respectively. The tabbed display of themes 504, 506, and 508 are reconfigured in interface 502 to represent changes in theme scores 214 associated with the different themes, such as in an example scenario where item listing system 104 determines that a user is most likely interested in offers for sale of the item 410 with a fastest shipping option, moderately interested in offers for sale of the item 410 in a used condition, and least likely to be interested in offers for sale of the item in a new condition. Interface 502 includes price indicator 510 representing an associated cost with accepting the offer for sale of item 410 via one of offers 304 or 306 included in theme 504.

In this manner, the rendering module 118 of the item listing system 104 is configured to dynamically update the item theme interface 202 based on current theme scores 214 generated by the theme scoring module 202, such that higher-ranked themes and their associated offers are displayed in a more prominent area of the item theme interface 202 than lower-ranked themes. In the illustrated examples of FIGS. 4 and 5, the themes are illustrated as being displayed adjacent to one another on a horizontal line, which maximizes an available area for displaying offers and their associated information at a display device of a computing device implementing the item listing system 104. In some implementations, a left-most position of the horizontal line corresponds to a most prominent positon, while a right-most position of the horizontal line corresponds to a least prominent position. However, positioning of different item themes 210 in the item theme interface 202 is not limited to a horizontal line, and arrangement of different themes 210 and their grouped offers 212 may be performed in any suitable manner according to the prioritization as indicated by theme scores 214.

Having considered example item theme interfaces, consider now a description of calculating theme scores for prioritizing the arrangement of item offer themes using the techniques described herein.

Figure 6:
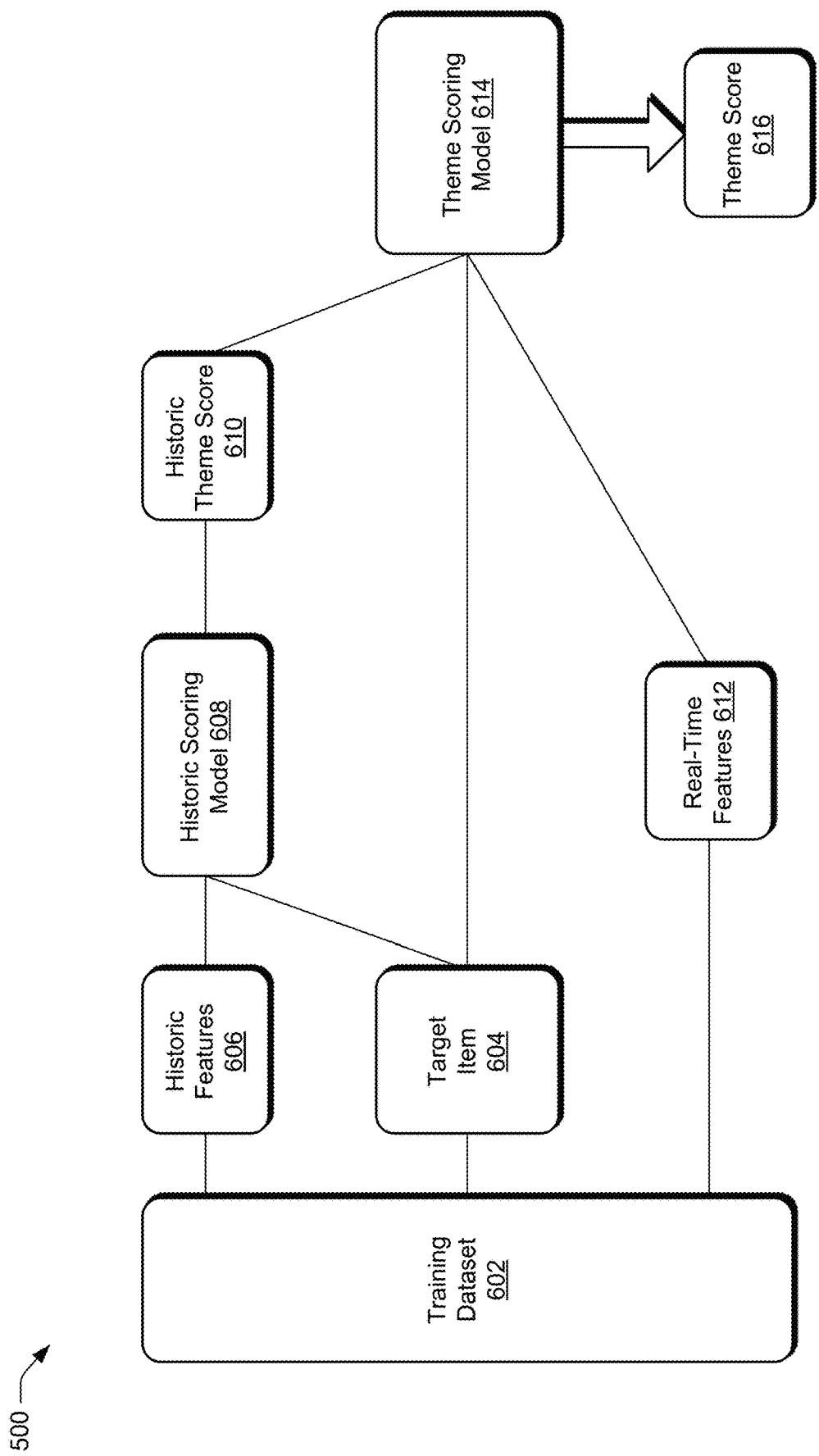
FIG. 6 illustrates an example implementation of the item listing system of FIG. 1 ranking themes using the techniques described herein.

FIG. 6 illustrates an example implementation 600 of the theme scoring module 116 calculating a theme score for a theme associated with a target item. Using the techniques described herein, the theme score may be used by the item listing system 104 in ranking themes to output a customized theme ranking 108 for use in generating an item theme interface 202. To compute a theme ranking for a given target item, the theme scoring module 116 implements two machine learning models, a historic scoring model and a theme scoring model, which are trained by the theme scoring module 116 in two phases.

In the first phase, the theme scoring module 116 extracts, from a training dataset 602, a target item 604 for which the theme score is to be generated and historic features 606 corresponding to the target item 604. The historic features 606 are representative of information describing previously recorded theme impressions for the target item 604 and other items included in the training dataset 602, which are indicative of user interest levels for the respective items. Alternatively or additionally, the historic features 606 include information describing historic item inventory availability, such as a number of offers for sale of a particular item, demand information describing a number and type of searches for the item (e.g., search queries, page loads, click through rates, and so forth), price-based information for the item (e.g., mean, median, variance, etc. of prices related to the item), and the like. Given the target item 604 and the historic features 606, the historic scoring model 608 is configured to calculate historic theme scores 610 for individual themes associated with offers for the target item 604.

In an example training implementation, feedback may be provided to the historic scoring model 608 in the form of positive or negative training examples indicating whether a historic theme score 610 is appropriate for an offer for sale of the target item 604. For instance, consider an example scenario where the target item 604 corresponds to a pair of shoes. In this example scenario, the historic features 606 may include information describing theme impressions for the particular pair of shoes. Specifically, the historic features 606 may indicate that a user clicked on a theme including offers for "new" sets of the pair of shoes, and that the user subsequently proceeded with purchasing an offer included in the "new" theme for the target item 604. Both the user's actions of clicking on the theme including "new" offers and purchasing the offer included in the "new" theme for the pair of shoes are representative of positive training examples for the historic scoring model 608 to indicate that the corresponding offer was correctly included in a "new" theme for the target item 604. Conversely, user actions that are associated with the absence of an intent of buying the target item 604 results in a corresponding data point being tagged as negative in training the historic scoring model 608.

Consequently, such positive training examples confirm that a high-value historic theme score 610 is appropriate for the particular offer of the target item 604 as being included in the "new" theme. Other actions such as adding the target item 604 to a cart when presented in a particular offer for sale, bidding on the target item, repeatedly viewing the target item 604, and so forth are further representative of positive training examples useable to train the historic scoring model 608 in computing the historic theme scores 610 for the target item 604. Alternatively or additionally, the historic features 606 for a target item 604 may include item properties, such as characteristics describing a category to which the item belongs in a product catalog, an amount of time that the target item 604 has been included in the product catalog, review ratings for the target item 604, combinations thereof, and so forth. Furthermore, the historic features 606 may be representative of item-level and theme-level characteristics for the target item 604 that capture historic interest for the target item 604 and one or more corresponding themes as included in an online marketplace or listing platform. Thus, the historic theme scores 610 are representative of classifier values describing a likelihood that a corresponding theme 610 for the target item 604 is of interest for a given user. In this manner, the historic scoring model 608 considers historic trends associated with individual users to generate a customized theme ranking 108 that is particular to the individual user for target item 604.

Given the vast amount of potential historic features 606 available for a target item 604, the theme scoring module 116 is configured to generate theme scores for the target item 604 in two phases, where the first phase includes generating the historic theme scores 610 using the historic scoring model 608 offline. By computing the historic theme scores 610 offline, the theme scoring module 116 reduces an amount of network resources that would otherwise be required to compute the historic theme scores 610 in real-time. The historic theme scores 610 can then be cached by the theme scoring module 116 before communication to the rendering module 118, thereby decreasing load times associated with rendering an item theme interface 202. By decreasing load times associated with rendering the item theme interface 202, the techniques described herein advantageously decrease latency of a listing platform that outputs the item theme interface 202, thereby increasing overall engagement with the listing platform. In accordance with one or more implementations, the historic scoring model 608 is representative of a tree-based ensemble model that generates the historic theme score 610 for a given theme.

After computing the historic theme scores 610, the theme scoring model proceeds to the second phase of computing a theme score by considering real-time features 612 associated with the target item 604 and its current offers for sale, as related included within various different themes. To do so, the theme scoring module 116 provides the target item 604, the historic theme scores 610, and real-time features 612 to a theme scoring model 614. As described herein, the real-time features 612 are representative of information describing a current availability of the target item 604. The current availability of a target item 604 may be specific to a listing platform on which the item theme interface 202 is to be output, or may be representative of the current availability of the target item 604 across multiple different listing platforms or online marketplaces.

Alternatively or additionally, the real-time features 612 are representative of price-based information that describes current pricing information for the target item 604 at both an item-based level as well as a theme-based level (i.e., to account for price variations for the target item 604 among different themes, such as prices for "new" offers of the target item 604 relative to prices for "used" offers of the target item 604, and so forth). The pricing information included in the real-time features 612 may further describe a deviation of current prices for the target item 604 relative to historic trends to account for current sales, price spikes, and so forth, thereby providing comprehensive information regarding current offers for the target item 604 to a viewing user. In accordance with one or more implementations, the theme scoring model 614 is trained using a logistic regression classifier, where the resulting theme score 616 in turn represents a linear function of historic theme scores and real-time inventory and price features for the target item 604. In this manner, the real-time features 612 can be considered by the theme scoring model 614 at runtime, during a page load of a webpage that includes the customized theme ranking 108 of FIG. 1 in the item theme interface 202 of FIG. 2, such as the illustrated examples of FIGS. 4 and 5.

Given the historic theme scores 610 and real-time features 612 for a target item 604, the theme scoring model 614 is configured to generate theme scores 616, which describe a relative significance of different themes for offers for sale of the target item 604 with the most up-to-date information available. In some implementations, the theme scores 616 may be representative of a purchase likelihood of offers for sale of the target item 604. For instance, the theme scores 616 may include individually ranked themes, such as "used" theme having a value of "1," a "new" theme having a value of "2," a "standard shipping" theme having a value of "3," and so forth. In some implementations, theme scores 616 having a value closer to one denote a higher likelihood of the corresponding theme being of interest to the user, while values further away from one denote a lower likelihood of the corresponding theme being of interest to the user.

In this manner, the theme scores 616 can be used to prioritize a display order of themes that include offers for sale of the target item 604. As such, the theme scores 616 are representative of the theme scores 214 computed by the theme scoring module, which provide a ranking of item themes 210 for various item offers 208 of a given item 106, as illustrated in FIG. 2.

In contrast to conventional approaches that implement classification metrics to evaluate individual classifiers, the theme scoring module 116 is configured to implement scale-rank metrics to evaluate the ranking performance of the historic scoring model relative to its computed historic theme scores. Using the techniques described herein, the theme scoring module is configured to generate theme scores that produce an optimal ranking of themes for a given target item 604, that are particular to a given user for which the item theme interface 202 is output.

Having considered example details of techniques for generating an item theme interface that includes a customized theme ranking for a specified item, consider now some example procedures to illustrate aspects of the techniques.

Example Procedure

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference may be made to FIGS. 1-6.

Figure 7:
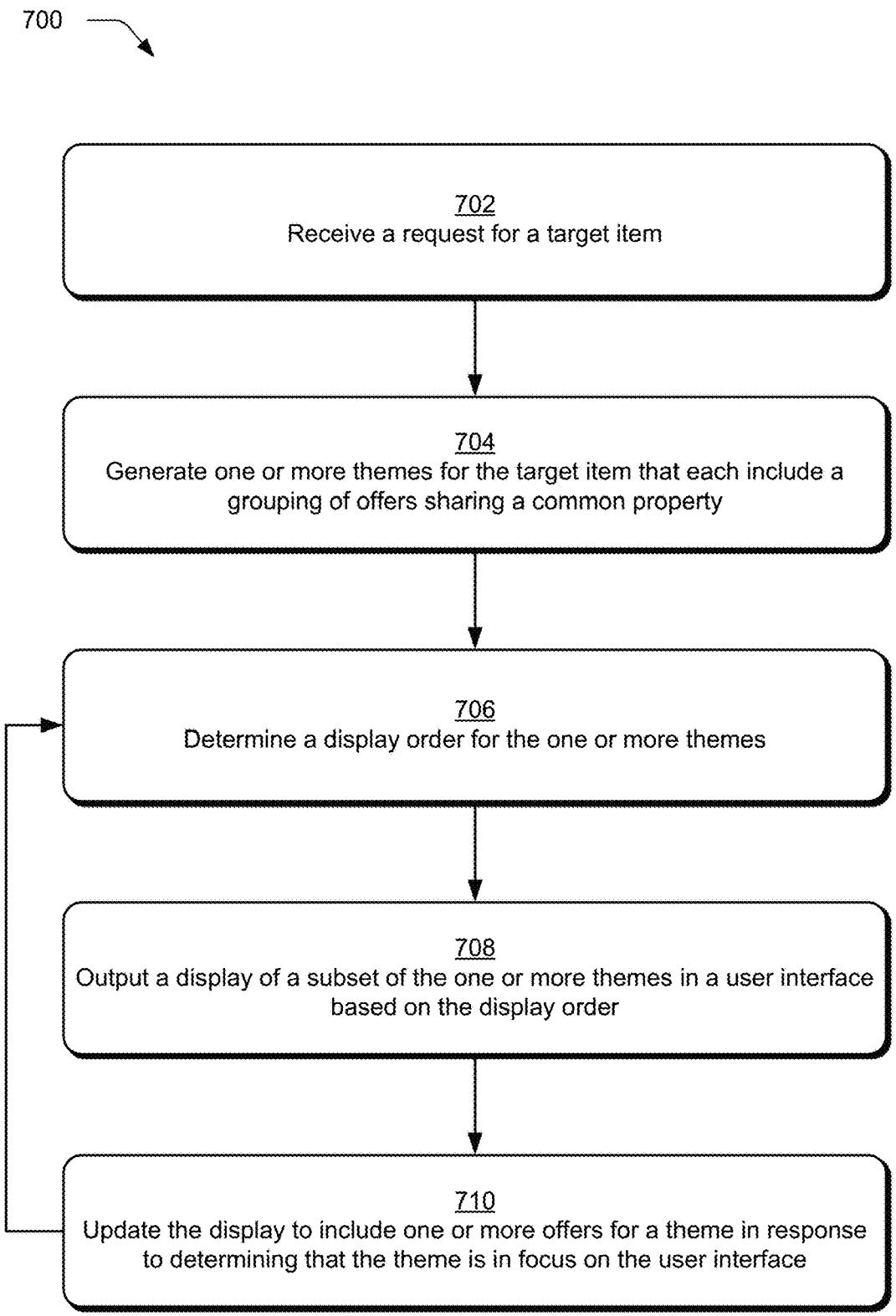
FIG. 7 is a flow diagram depicting a procedure in an example implementation for displaying an interface including ranked themes using the techniques described herein.

FIG. 7 depicts a procedure 700 in an example implementation of outputting a display of an item theme interface that includes a customized theme rankling for a given item using the techniques described herein. A request for a target item is received (block 702). A computing device implementing the item listing system 104, for instance, receives information identifying item 106 on a listing platform or online marketplace. In some implementations, the information identifying item 106 may be received as part of an item catalog or inventory list for the listing platform or online marketplace. Alternatively or additionally, the information identifying item 106 may be received in the form of a search query for the item 106, such as via a search term input area of a user interface for browsing the listing platform or online marketplace.

After receiving the request for the target item, one or more themes are generated for the target item, where each theme includes a grouping of offers for sale of the target item that share a common property (block 704). The item listing system 104, for instance, may employ the offer identification module 110 to identify all offers for sale of the target item on a given listing platform, or across multiple different listing platforms. The offer identification module 110 may generate a listing of item offers 208 for the target item, as represented by item 106 in FIG. 2. The item listing system 104 may then employ the theme module 112 to generate item themes 210 for grouping the item offers 208 based on various properties 206 of the offers for sale 204 of the item 106. The theme module 112 is configured to generate any suitable number of different themes for subsequent grouping of the offers 204 by the grouping module 114. After the theme module 112 generates the item themes 210, the grouping module 114 is configured to output grouped offers 212, which are representative of the various item offers 208 identified by the offer identification module 110 assigned to respective ones of the item themes 210 based on their associated offer properties 206.

A display order for the one or more themes is then determined (block 706). The theme scoring module 116, for instance, computes a ranking for each of the themes generated by the theme module 112. To do so, the theme scoring module 116 implements historic scoring model 608 to generate historic theme scores 610 based on historic features 606 for the item 106, as illustrated and described with respect to FIG. 6. Additionally, the theme scoring module 116 implements theme scoring model 614 to generate a theme score 616 for each theme generated by the theme module 112, based on the historic theme scores 610 generated by the historic scoring model 608 as well as real-time features 612 describing a current availability of the item 106 as well as current offers for sale of the item 106 on one or more listing platforms or online marketplaces. In this manner, the theme scores 616 are representative of information useable to rank the various themes generated by the theme module 112, which account for both historical inventory supply and demand data for the item 106, coupled with real-time supply, demand, price variation, and user behavior data to determine an optimal display order for the various themes in a manner that presents the most relevant themes in a more prominent position of a user interface than less relevant themes.

A display of a subset of the one or more themes is output in a user interface based on the display order (block 708). The rendering module 118, for instance, identifies a top-ranked subset of the item themes 210 based on the theme scores 214 and outputs a display of an item theme interface 202. In an example implementation, the rendering module 118 may identify from the theme scores 214 that a top-ranked theme for the item 106 includes offers 204 having a property 206 indicating that the item 106 is offered in a "new" condition. Similarly, the rendering module 118 may identify that a second-ranked theme for the item 106 includes offers having a property 206 indicating that the item 106 is offered in a "used" condition, and that a third-ranked theme for the item 106 includes offers 204 having a property 206 indicating that the item 106 is offered for sale with a fastest-available shipping method, such as same-day shipping. In such an example scenario, the rendering module 118 is configured to output display of an item theme interface such as the illustrated example of FIG. 4. The display is then updated to include one or more offers for the theme in response to determining that the theme is in focus on the user interface (block 710). The rendering module 118, for instance, is configured to cause the top-ranked theme to be automatically output in a most-prominent portion of the interface 402, with the top-ranked theme and included offers 302 and 308 automatically in focus of the user interface, contrasted against the second-ranked and third-ranked themes.

The rendering module 118 is further configured to monitor changes to the customized theme ranking 108 as indicated by the theme scores 214 by the arrow returning to block 706 from block 710. In this manner, the rending module 118 is configured to dynamically update a display of the item theme interface 202 based on changes to the real-time features 612 associated with the item 106 and/or user behaviors for a user viewing the item 106. For instance, changes to real-time features 612 may indicate that the theme scores are to be updated such that the third-ranked theme for the item 106 including offers 204 having properties 206 indicating that the item 106 is offered for sale with a fastest-available shipping method is now the top-ranked theme for the item 106, and that the theme for the item 106 including offers 204 having properties 206 indicating that the item 106 is offered for sale in a "new" condition is now the third-ranked theme.

In such an example scenario, the rendering module 118 is configured to transition from the display in the illustrated example of FIG. 4 to the display in the illustrated example of FIG. 5, with the fastest shipping offers 304 and 306 displayed in a most prominent position of the interface 502 and the offers corresponding to the "new" theme relegated to a less prominent position of the interface 502. In this manner, the item listing system 104 is configured to output a display of various offers for sale of an item of interest that considers historic information for the item and dynamically updates to account for changes in user behavior of a user viewing the item as well as changes to availability and pricing information for the item on one or more listing platforms.

Having described example procedures in accordance with one or more implementations, consider now an example system and device that can be utilized to implement the various techniques described herein.

Example System and Device

Figure 8:
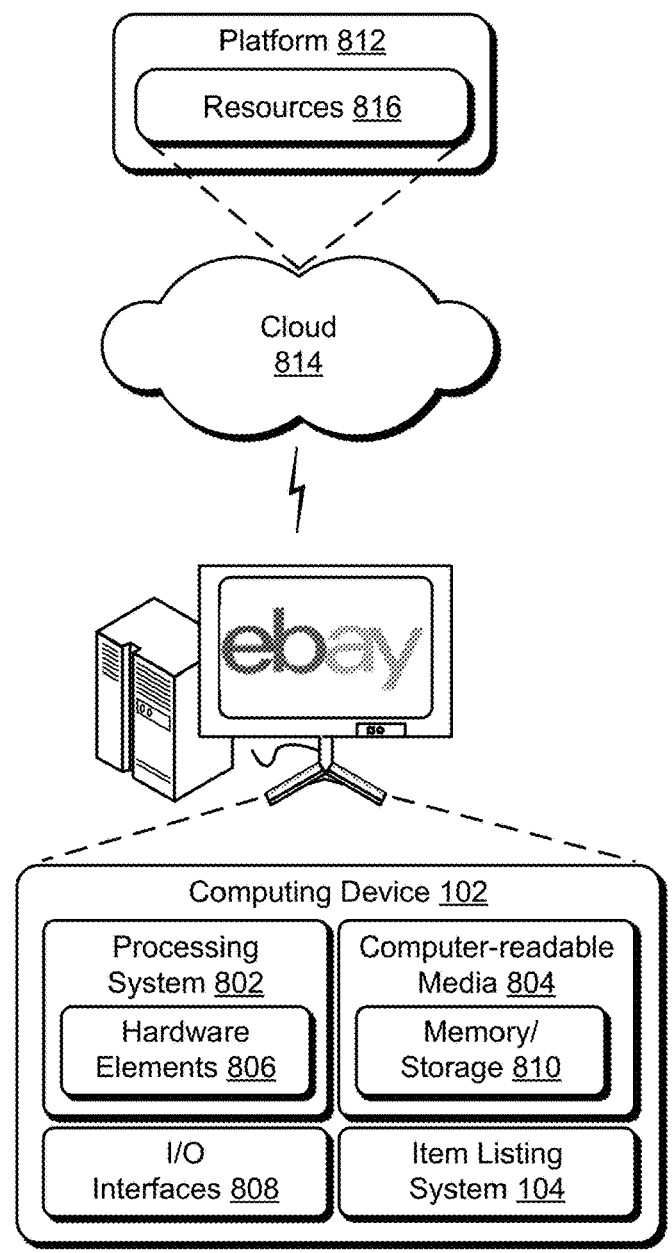
FIG. 8 illustrates an example system including various components of an example device that can be implemented as a computing device as described and/or utilized with reference to FIGS. 1-7 to implement the techniques described herein.

FIG. 8 illustrates an example system generally at 800 that includes an example computing device 802 that is representative of one or more computing systems and/or devices that may implement the various techniques described herein. This is illustrated through inclusion of the item listing system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   receiving, from a client device, a request for a particular target item listed by a listing platform;
   generating themes for the particular target item, each theme comprising a grouping of offers for the particular target item that share at least one common property;
   ranking the themes for the particular target item using a first machine learning model of a theme scoring module to generate historic theme scores for the themes offline based on user behavior data associated with previous user interactions with the particular target item on the listing platform, the theme scoring module caching the historic theme scores and communicating the historic theme scores to a second machine learning model of the theme scoring module that ranks the themes based on the historic theme scores and based on real-time inventory data and real-time price data associated with the offers for the particular target item;
   determining a display order for the themes based on the ranking by selecting a top-ranked subset of the themes based on the ranking and arranging the themes of the top-ranked subset of the themes according to the ranking;
   communicating the display order to the client device to cause display of representations for the top-ranked subset of the themes in a user interface of the listing platform, the representations arranged in the user interface according to the display order;
   dynamically updating the display order for the themes in real-time based on a change in the real-time inventory data and the real-time price data associated with the offers for the particular target item, the dynamically updating the display order including updating the ranking of the themes for the particular target item and selecting a new top-ranked subset of the themes; and
   communicating the updated display order to the client device to cause the client device to update the displayed representations by changing an order in which the representations are arranged in the user interface based on the updated display order.

2. The computer-implemented method of claim 1, wherein at least one of the themes or the display order changes for different target items.

3. A system comprising:
   an offer identification module implemented at least partially in hardware of a computing device to receive a request for a particular target item;
   a theme module implemented at least partially in hardware of the computing device to generate themes for the particular target item, each of the themes comprising a grouping of offers for the particular target item that share at least one common property;
   a theme scoring module implemented at least partially in hardware of the computing device to:
      rank the themes for the particular target item using a first machine learning model to generate historic theme scores for the themes offline based on user behavior data describing previous user interactions with the particular target item on a listing platform, the historic theme scores being cached by the theme scoring module and communicated to a second machine learning model of the theme scoring module that ranks the themes based on the historic theme scores and based on real-time inventory data and real-time price data associated with the offers for the particular target item; and
      determine a display order for the themes by selecting a top-ranked subset of the themes and arranging the themes of the top-ranked subset of the themes according to the ranked themes;
   a rendering module implemented at least partially in hardware of the computing device to cause a display of representations for the top-ranked subset of the themes, the representations arranged according to the display order in a user interface, wherein the display order is configured to be dynamically updated in real-time to include a new top-ranked subset of the themes based on an update to the ranked themes as a result of a change in the real-time inventory data and the real-time price data associated with the offers for the particular target item, the rendering module further causing an order in which the representations are arranged in the user interface to change based on the updated display order.

4. The system as described in claim 3, wherein the rendering module arranges the representations in the user interface according to the display order such that a representation of a highest ranked theme is displayed in a prominent position in the user interface.

5. The system as described in claim 4, wherein the representations include at least a left-most representation and a right-most representation, and wherein the representation of the highest ranked theme is displayed as the left-most representation.

6. The computer-implemented method of claim 1, wherein communicating the display order to the client device causes the client device to display a first representation associated with a first theme in a first position in the user interface, display a second representation associated with a second theme in a second position in the user interface, and display a third representation associated with a third theme in a third position in the user interface.

7. The computer-implemented method of claim 6, wherein communicating the updated display order to the client device causes the client device to change the order in which the representations are arranged by moving the at least one of the first representation, the second representation, or the third representation to a different one of the first position, the second position, or the third position.

8. The computer-implemented method of claim 6, wherein communicating the updated display order to the client device causes the client device to change the order in which the representations are arranged by replacing at least one of the first representation, the second representation, or the third representation with a fourth representation associated with a fourth theme.

9. The computer-implemented method of claim 1, wherein the top-ranked subset of the themes includes at least two of a used condition theme, a new condition theme, a standard shipping theme, a fast shipping theme, a same-day shipping theme, or a low price theme.

10. The computer-implemented method of claim 1, further comprising:
computing a deviation of current pricing information for the particular target item relative to historic price trends for the particular target item; and
ranking the themes for the particular target item based at least in part on the deviation.

11. The computer-implemented method of claim 1, further comprising:
computing a deviation of current pricing information for the themes for the particular target item relative to historic price trends for the themes for the particular target item; and
ranking the themes for the particular target item based at least in part on the deviation.

12. The computer-implemented method of claim 1, wherein the particular target item comprises a single item, and the grouping of offers comprises multiple offers for the single item.

13. One or more non-transitory computer-readable media having instructions stored thereon that, responsive to execution by a processor, causes the processor to perform operations including:
receiving, from a client device, a request for a particular target item listed by a listing platform;
generating themes for the particular target item, each theme comprising a grouping of offers for the particular target item that share at least one common property;
ranking the themes for the particular target item using a first machine learning model of a theme scoring module to generate historic theme scores for the themes offline based on user behavior data associated with previous user interactions with the particular target item on the listing platform, the theme scoring module caching the historic theme scores and communicating the historic theme scores to a second machine learning model of the theme scoring module that ranks the themes based on the historic theme scores and based on real-time inventory data and real-time price data associated with the offers for the particular target item;
determining a display order for the themes based on the ranking by selecting a top-ranked subset of the themes based on the ranking and arranging the themes of the top-ranked subset of the themes according to the ranking;
communicating the display order to the client device to cause display of representations for the top-ranked subset of the themes in a user interface of the listing platform, the representations arranged in the user interface according to the display order;
dynamically updating the display order for the themes in real-time based on a change in the real-time inventory data and the real-time price data associated with the offers for the particular target item, the dynamically updating the display order including updating the ranking of the themes for the particular target item and selecting a new top-ranked subset of the themes; and
communicating the updated display order to the client device to cause the client device to update the displayed representations by changing an order in which the representations are arranged in the user interface based on the updated display order.

14. The one or more non-transitory computer-readable media of claim 13, the operations further comprising displaying offers associated with a theme from the top-ranked subset of the themes in the user interface of the listing platform in response to receiving a selection of the theme from the top-ranked subset of the themes.

15. The one or more non-transitory computer-readable media of claim 13, the operations further comprising:
receiving a request for a different target item;
determining a different display order for a different subset of themes for the different target item; and
communicating the different display order to the client device to cause display of the different subset of themes for the different target item according to the different display order.

16. The one or more non-transitory computer-readable media of claim 13, wherein the representations are arranged in the user interface according to the display order, such that a higher-ranked representation is displayed in a more prominent position than a lower-ranked representation.

17. The one or more non-transitory computer-readable media of claim 16, wherein the representations are displayed adjacent to one another in a horizontal line, wherein a left edge of the horizontal line corresponds to a prominent position and a right edge of the horizontal line corresponds to a less prominent position.

18. The one or more non-transitory computer-readable media of claim 13, wherein the new top-ranked subset of the themes includes at least one new theme which was not included in the top-ranked subset of the themes.

19. The computer-implemented method of claim 1, wherein the selecting the top-ranked subset of the themes excludes at least one of the generated themes from the top-ranked subset of the themes.

20. The system as described in claim 3, wherein the top-ranked subset of the themes includes at least two of: a new condition theme, a standard shipping theme, a used condition theme, or a fastest available shipping theme.

* * * * *